United States Patent  [11] 3,542,473

| [72] | Inventors | Lawrence F. Herte<br>Palo Alto;<br>Frank R. Kloss, San Francisco, California |
|---|---|---|
| [21] | Appl. No. | 626,155 |
| [22] | Filed | March 27, 1967 |
| [45] | Patented | Nov. 24, 1970 |
| [73] | Assignee | Varian Associates<br>Palo Alto, California<br>a corporation of California |

[54] FIZEAU PLATE FOR USE IN MULTIPLE BEAM INTERFEROMETERS
2 Claims, 4 Drawing Figs.

| [52] | U.S. Cl. | 356/109,<br>350/12 |
|---|---|---|
| [51] | Int. Cl. | G02b 21/06;<br>G01b 9/02 |
| [50] | Field of Search | 350/12,<br>334, 157; 356/107—109, 120 |

[56] References Cited
UNITED STATES PATENTS

| 3,442,594 | 5/1969 | Minard et al. | 350/81X |
| 3,352,198 | 11/1967 | Klute | 350/12X |
| 3,046,837 | 7/1962 | Barabas et al. | 350/13X |

FOREIGN PATENTS

| 631,251 | 10/1949 | Great Britain | 350/14 |

OTHER REFERENCES
Born, et al. PRINCIPLES OF OPTICS, The MacMillan Co., N.Y. 1964, pp 289— 291

*Primary Examiner*—Paul R. Gilliam
*Attorneys*—William J. Nolan and Leon F. Herbert

ABSTRACT: A Fizeau plate for use in optical interferometers. A portion of the Fizeau plate has a reflective coating while the remainder is transparent to permit direct viewing for identification of an adjacent region of the specimen whose surface variations are being observed.

Patented Nov. 24, 1970

3,542,473

INVENTORS
LAWRENCE F. HERTE
FRANK R. KLOSS

BY *Leon F. Herbert*
ATTORNEY

FIZEAU PLATE FOR USE IN MULTIPLE BEAM INTERFEROMETERS

BACKGROUND OF THE INVENTION

The present invention relates generally to multiple beam interferometers, and more particularly to an improved Fizeau plate for use in such interferometers to permit simultaneously viewing of a portion of the specimen surface and interference pattern of an adjacent portion.

In known multiple beam interferometers, a specimen to be analyzed for microscopic variations in surface contour on the order of 30 to 20,000 Angstroms is brought into contact with an optical flat or Fizeau plate with a predetermined air wedge angle between them. A source of monochromatic light irradiates the specimen and Fizeau plate in a direction normal to the surface of the specimen. A microscope is used to provide a magnified image of the interference lines which appear in the air wedge. Measurements of shifts in line spacing provide an accurate indication of minute surface variations.

Many applications of the optical interferometer require that the portion of the specimen which is being viewed be readily and accurately identifiable. For example, in evaluation of the coating thicknesses of various portions of a microelectronic circuit, precise determination of the region of the specimen being observed is essential. Prior art interferometers have made no provision for identifying the portion of the specimen being observed other than interpretation of the interferogram itself or time-consuming removal of the Fizeau plate for direct optical observation of the specimen. While interpretation of the interferogram is satisfactory for the identification of several different coatings when these coatings differ in thickness by an order of magnitude or more, the method becomes very uncertain when coating thicknesses differ by only a small amount.

SUMMARY OF THE INVENTION

According to the present invention the necessary identification is accomplished by direct optical observation of a portion of the specimen within the field of view of the microscope lens system while at the same time the interference fringe pattern of an adjacent portion of the specimen within the field of view is observed.

Accordingly, it is an object of the present invention to provide a multiple beam interferometer having means for convenient direct optical viewing of the specimen.

It is a further object to provide a multiple beam interferometer in which a portion of the specimen can be observed simultaneously with the interference fringe pattern of an adjacent portion.

The above and still further objects, features and advantages of the present invention will become apparent upon consideration of the following detailed description of one specific embodiment thereof, especially when taken in conjunction with the accompanying drawings.

DESCRIPTION OF THE PREFERRED EMBODIMENT

Figure 1:
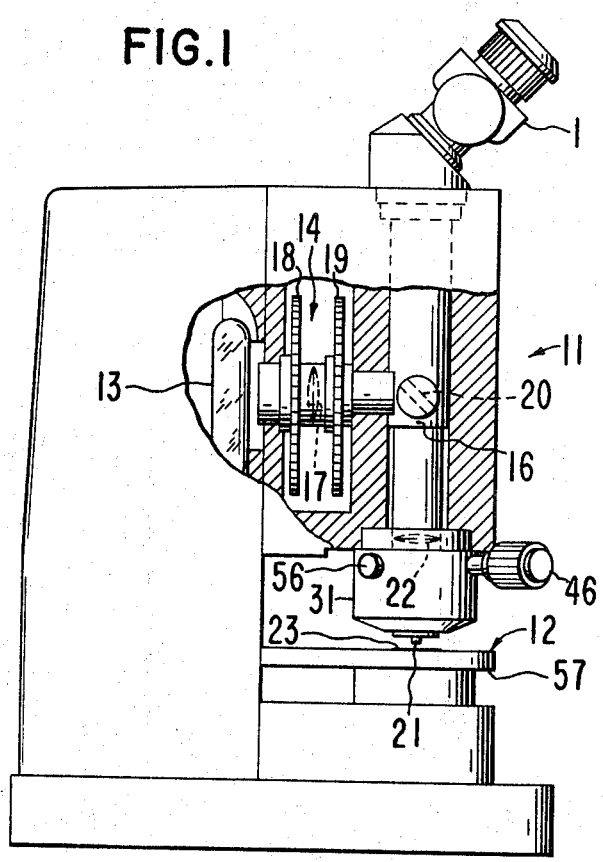
FIG. 1 is an illustration of a conventional reflection type multiple beam interferometer.
Figure 2:
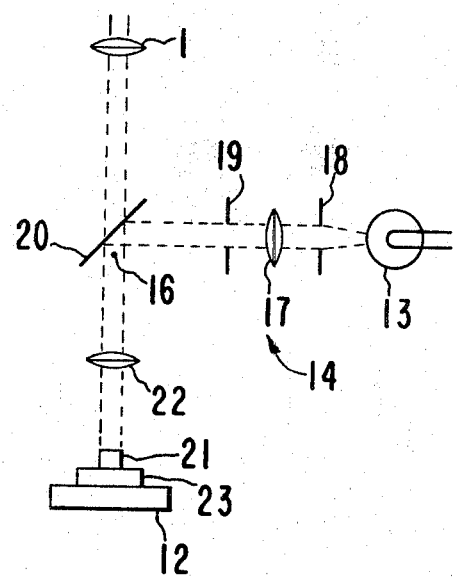
FIG. 2 is a schematic diagram of the optical elements employed in a multiple beam interferometer according to the present invention.

Referring to FIGS. 1 and 2, a multiple beam reflective type interferometer 11 for producing Fizeau fringe patterns which are representative of the contour of the surface of a specimen 23 residing on specimen plate 12 comprises a monochromatic light source 13, such as sodium vapor lamp, mounted at right angles to the reflective viewing path. An optical illuminating system 14 is arranged to receive and project an image of source 13 at a selected image point 16. Such an illuminating system 14 will generally comprise a condensing lens 17 mounted between an adjustable field of illumination-defining iris 18 and an adjustable field-intensity-defining iris 19. A half silvered mirror 20 is positioned to receive the light from the optical system 14 and project it towards the Fizeau plate 21 and specimen plate 12 of interferometer 11.

In multiple beam interferometers, a parallel beam of light is employed to form the Fizeau fringe patterns. To generate the required parallel beam of light, an objective lens 22 is mounted so that image point 16 lies at its back focus. The light at image point 16 is rendered parallel by the objective lens 22 to fall on Fizeau plate 21 and specimen 23. Plate 21 and specimen 23 must be positioned just beyond the focal point of the objective lens 22 in order that an image of the fringe pattern is produced by eye piece 1 located on the side of mirror 20 opposite objective lens 22. Objective lens 22 and eye piece 1 together form a microscope lens system for viewing the Fizeau plate 21 and specimen 23.

The Fizeau fringe pattern is generated by positioning the plates 12 and 21 to define an air wedge of very small angle between Fizeau plate 21 and specimen 23. The size of the air wedge angle defined by the plates is adjusted in accordance with the size of the surface variations to be encountered by turning screws 46 and 56 which bear against a Fizeau plate carrier (not shown) within housing 31. Specimen plate holder 57 is spring loaded in an upward direction to support specimen 23 in contact with Fizeau plate 21.

Figure 3:
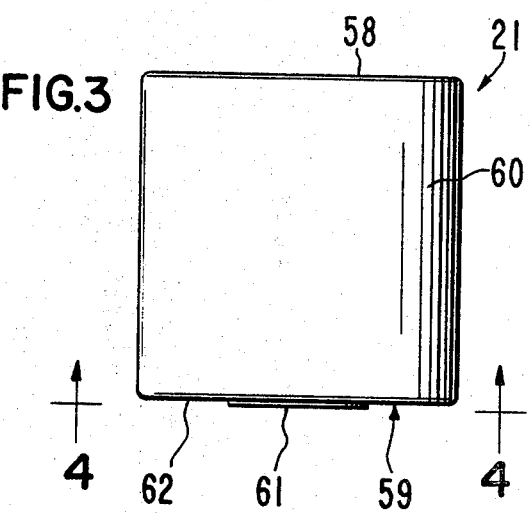
FIG. 3 is a side view of an optical flat or Fizeau plate according to the present invention.
Figure 4:
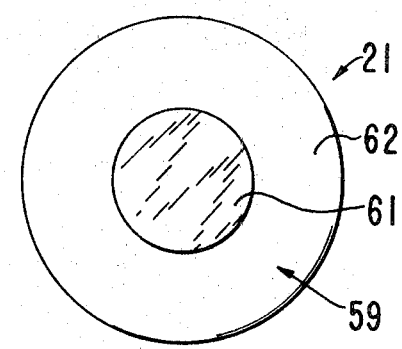
FIG. 4 is a view taken along line 4-4 of FIG. 3, showing the lower surface of the Fizeau plate which contacts the specimen.

Turning now to FIGS. 3 and 4, the Fizeau plate or optical flat 21 of the present invention is shown. Fizeau plate 21 may be made of optical glass or quartz. Upper surface 58 and lower surface 59 are ground and polished so that each is optically flat and transparent to a high degree. During this operation, surfaces 58 and 59 are brought into parallelism. Cylindrical edge 60 is ground and may be opaque or translucent.

As seen in FIG. 4 a central circular portion 61 of lower surface 59 is coated with a substance which is partially reflective at the wavelength of light used for observation. For example, the coated portion 61 might reflect 94 percent of the light incident upon the surface from sodium vapor lamp 13 and transmit the remaining 6 percent. The surrounding annular portion 62 is not coated and remains optically transparent.

As a result of this coating, interference fringe lines will be formed under central portion 61 in the air wedge between Fizeau plate 21 and may be observed at eye piece 1 by moving objective lens 22 to bring these lines into focus.

Fizeau plate 21 is typically dimensioned the same size as or smaller than the field of view of the microscope lens system and may be, for example, 0.150 inches in diameter. Moreover, the wedge angles typically used are so small that the interference fringe lines formed at the lower surface 59 under the central portion 61 are very nearly in the same plane as the surface of specimen 23. Hence, when objective lens 22 is moved to bring the fringe lines into focus at eye piece 1, the microscope lens system is also, to a good approximation, in focus on the surface of specimen 23.

Thus the image seen through eye piece 1 includes not only a circular central portion displaying the interference fringe lines but also a surrounding annular portion displaying an image of the surface of the specimen.

In this manner the operator can rapidly and conveniently identify the region of the specimen being observed.

We claim:

1. An interferometer for analyzing a specimen by inspection of interference fringe patterns, said interferometer comprising an optical plat having a partially reflective coating on one surface thereof, means for positioning said optical flat adjacent a specimen to be inspected to define an air wedge therebetween, a microscope lens system defining a field of view for magnified observation of said flat and said specimen, and a source of light positioned to irradiate said plate and said specimen in a direction parallel to the optical axis of said lens system for producing interference fringes between the light reflected from said coating and said specimen, said coating covering a portion of said one surface smaller in area than the area of said one surface within said field of view whereby a direct optical image of a portion of said specimen can be observed with said microscope lens system through the portions of said one surface not covered by said coating so that the portion of said specimen undergoing investigation can be identified.

2. The improvement according to claim 1 wherein said portion covered by said coating is a circle centered upon said one surface, and the uncoated area surrounds said portion.